US006980960B2

(12) United States Patent  (10) Patent No.: US 6,980,960 B2
Hajdukiewicz et al.  (45) Date of Patent:  Dec. 27, 2005

(54) SYSTEM AND METHOD FOR PROVIDING A FUEL PURCHASE INCENTIVE

(75) Inventors: Richard Stanley Hajdukiewicz, New York, NY (US); James P. Riley, Garden City, NY (US)

(73) Assignee: Goldman Sachs & Co., New York, NY (US)

( * ) Notice: Subject to any disclaimer, the term of this patent is extended or adjusted under 35 U.S.C. 154(b) by 839 days.

(21) Appl. No.: 09/819,338

(22) Filed: Mar. 28, 2001

(65) Prior Publication Data

US 2002/0143616 A1    Oct. 3, 2002

(51) Int. Cl.$^7$ ............................................. G06F 17/60
(52) U.S. Cl. ......................................................... 705/14
(58) Field of Search ......................................... 705/14

(56) References Cited

U.S. PATENT DOCUMENTS 5,864,822 A * 1/1999 Baker, III .................... 705/14
6,321,984 B1 * 11/2001 McCall et al. .............. 235/381
6,422,464 B1   7/2002 Terranova

OTHER PUBLICATIONS

Holly, Dawn, "Sun joins co-branded card war with new Mastercard," Sep. 26, 1994, U.S. Oil Week, v31, n38.*
"Oldsmobile offers free Amoco gasoline purchase incentive," Jan. 31, 1989, PR Newswire, 0131NY102.*
Heating Oil Futures and Options [www.infinitytrading.com/heating.htm].
"Sales Gimmicks by Automakers Become More Creative, Selective" by Dow Jones News, Arizona Republic, Jun. 14, 1997.

* cited by examiner

*Primary Examiner*—Jeffrey D. Carlson
(74) *Attorney, Agent, or Firm*—Greenberg Traurig, LLP (57) ABSTRACT

A fuel purchase incentive is provided incident to the sale of a vehicle. With respect to the sale of an automobile, the incentive consists of a program price, for example a discount price or a capped maximum price, for a specified quantity of a specified brand and type of gasoline. The incentive is calculated as a function of the anticipated geographical and other use factors of the automobile buyer. The incentive information is provided to the buyer at the time of purchase of the automobile and stored for use by an incentive program operator. When the buyer purchases gasoline pursuant to the incentive program, that is of a specified brand, grade and quantity, the purchase information is transmitted to the incentive program operator. A rebate, equal generally to the difference between the retail price and the program price, is calculated and transmitted to a credit card processor for application to a credit card bill. A credit card account identifier is the preferred method of identifying the buyer and providing rebates under the program. The invention has application to vehicles other than automobiles and fuels other than gasoline. In one embodiment, a hedge program may be developed to offset the risk associated with guaranteeing the price of the fuel.

16 Claims, 10 Drawing Sheets

CUSTOMER INCENTIVE DATABASE RECORD 36

| CUSTOMER NAME | CREDIT CARD INFORMATION | GAS GRADE | GAS QUANTITY | PROGRAM PRICE | GALLONS USED THIS MONTH | DATE INFORMATION |
|---|---|---|---|---|---|---|
| JOHN SMITH | 123-4567-8910 | 89 OCTANE BRAND A | 40 GALLONS/MONTH | $1.50 | 15 | PURCHASE DATE, PROGRAM DATE RANGE |
| JANE DOE | 234-5678-9101 | 90 OCTANE BRAND A | 100 GALLONS/MONTH | $1.60 | 40 | PURCHASE DATE, PROGRAM DATE RANGE |

Fig. 5

GASOLINE PURCHASE DATABASE RECORD 40

| CUSTOMER NAME | CREDIT CARD INFORMATION | GAS GRADE | GALLONS OF GAS PURCHASED | RETAIL PUMP PRICE | TAXES |
|---|---|---|---|---|---|
| JOHN SMITH | 123-4567-8910 | 89 | 10 | $2.00/GALLON | $0.15/GALLON |
| JANE DOE | 234-5678-9101 | 90 | 20 | $2.25/GALLON | $0.20/GALLON |

Fig. 6

AUTOMOBILE SALES DATABASE RECORD 44

| CUSTOMER NAME | CUSTOMER INFORMATION & CREDIT CARD NUMBER | CUSTOMER INCENTIVE INFORMATION | INCENTIVE DATE INFORMATION | AUTOMOBILE SALES INFORMATION |
|---|---|---|---|---|
| JOHN SMITH | 123-4567-8910 | 89 OCTANE/40 GALS. PER MONTH/$1.50 + TAXES/GALLON | PURCHASE DATE, PROGRAM LENGTH | SUV MODEL ABC, RED, 4WD, OPTION PACKAGE Z |
| JANE DOE | 234-5678-9101 | 90 OCTANE/100 GALS. PER MONTH/$1.60 + TAXES/GALLON | PURCHASE DATE, PROGRAM LENGTH | SPORTS SEDAN MODEL BCD, YELLOW, OPTION PACKAGE L |

Columns: 44A, 44B, 44C, 44D, 44E
Rows: 45A, 45B

SAMPLE CALCULATION SPREADSHEET 111

| VARIABLE | COST OR QUANTITY | DESCRIPTION OF VARIABLE OR CALCULATION |
|---|---|---|
| GASOLINE QUANTITY | 15 GALLONS | QUANTITY OF GASOLINE PURCHASED AT RETAIL PUMP |
| RETAIL PUMP PRICE/GALLON | $2.00 | RETAIL PRICE PAID AT PUMP |
| TAXES/GALLON | $0.20 | TAXES IN RETAIL PRICE |
| TOTAL CUSTOMER RETAIL PRICE | $30.00 | GASOLINE QUANTITY * RETAIL PUMP PRICE/GALLON |
| PROGRAM PRICE/GALLON | $1.50 | AS CALCULATED BY INCENTIVE PROVIDER; RETRIEVED FROM STORAGE |
| TOTAL CUSTOMER INCENTIVE PRICE | $25.50 | (PROGRAM PRICE/GALLON + TAX/GALLON) * GASOLINE QUANTITY |
| REBATE TO CUSTOMER | $4.50 | TOTAL CUSTOMER RETAIL PRICE – TOTAL CUSTOMER INCENTIVE PRICE |

Fig. 9

CREDIT CARD DATABASE RECORD 32

| CUSTOMER NAME | CUSTOMER CREDIT CARD INFORMATION | INCENTIVE PROGRAM MEMBER? | INCENTIVE PROGRAM INFORMATION | OTHER CUSTOMER INFORMATION |
|---|---|---|---|---|
| JOHN SMITH | 123-4567-8910 | YES | AUTOMOBILE MANUFACTURER A | ADDRESS, ACCOUNT INFORMATION, ETC. |
| JANE DOE | 234-5678-9101 | YES | AUTOMOBILE MANUFACTURER A | ADDRESS, ACCOUNT INFORMATION, ETC. |

Fig. 10

SYSTEM AND METHOD FOR PROVIDING A FUEL PURCHASE INCENTIVE

FIELD OF THE INVENTION

The present invention relates generally to incentive programs and more particularly to methods and systems for facilitating a vehicle sales incentive program including a program price for fuel.

BACKGROUND OF THE INVENTION

In order to both increase sales and control inventory, many automobile manufacturers provide incentive programs to stimulate the sale of automobiles. Such incentive programs are typically executed through the local dealer at the time of purchase.

Many different types of automobile sales incentive programs are known to those skilled in the art, including for example, incentive programs relating to financing, cashback to the customer and various free maintenance and extended warranty programs.

In a typical incentive financing program, an automobile manufacturer may offer a combination of interest rates and payment schedules that are generally more favorable than those available through conventional bank financing. In a cash-back incentive program, a manufacturer may offer a predetermined sum of cash back to a buyer, the cash being available to the buyer to either lower the purchase price of the automobile or to simply take and use for other purposes. Such programs are offered to customers through local dealers, with the costs, and in many cases the implementation and processing, being subsidized by the manufacturer.

In a typical free maintenance program, a buyer is offered free maintenance for some period of ownership. Again, a local dealer runs the program with the guidelines provided and the costs typically absorbed by the manufacturer. The same is true with an extended warranty program, whereby a dealer offers the extended warranty in accordance with terms set by the manufacturer, with dealer maintenance costs being reimbursed by the manufacturer.

Incentive programs have become an ingrained part of the automobile sales process. With the exception of limited, high-demand automobiles, incentives are often necessary for a manufacturer to maintain desirable sales levels. Incentives also have the benefit of providing the manufacturer the ability to control inventory. If, for example, a manufacturer anticipates the release of a new model, incentives maybe applied to a current model in order to avoid a backlog of older cars after the introduction of the newer cars.

Buyers generally understand that the purchase price of an automobile represents only a partial cost of automobile ownership. There are, for example, additional operating costs such as fuel, oil, tires and maintenance. There are finance costs. There is the cost of insurance, required bylaw in most states. Further there is the loss-of-use costs for the monies invested in purchasing and/or leasing the automobile. Buyers increasingly look to manufacturer incentive programs to help defray the total cost of automotive ownership.

In addition to the benefits to both manufacturers and buyers described above, automobile sales incentive programs provide the additional benefit of enabling a buyer to purchase a more expensive vehicle. The provision, for example, of cash back, enables a buyer to use that cash to purchase a more expensive automobile than they may have otherwise been able to afford. Other incentives that defray total ownership costs likewise have the result of enabling a buyer to 'buy up' to a better automobile. This provides a benefit both to the automobile manufacturer, who can sell a more expensive car, and also to the buyer, who can purchase a better car than they might otherwise have been able to afford.

Automobile incentive programs thus have recognized benefits to both buyers and sellers. Because automobile sales represent a significant portion of consumer transactions in many countries, such incentive programs have the further benefit of improving the overall economy.

SUMMARY OF THE INVENTION

The present invention provides a vehicle purchase incentive program that caps or lowers the cost of fuel as an operating cost to the buyer. More particularly, the present invention provides systems and methods for providing an attractive program price for fuel purchases to a consumer purchasing a vehicle.

In one embodiment of the invention there is provided a method and system for providing a user a program price for a vehicle fuel, the method comprising the steps of: receiving an account identifier; determining the program price; storing the program price in association with the account identifier on the computer; receiving purchase information indicating a purchase of the vehicle fuel at a retail price using the account identifier; retrieving the program price from the computer; and calculating, using the program price and the retail price, a payment due to the customer.

In another embodiment of the invention there is provided a method and system for calculating a payment due on a purchase of a vehicle fuel by a customer, the method comprising the steps of: receiving purchase data describing a purchase of the vehicle fuel by the customer, the purchase data including an account identifier and a purchase price; retrieving from the computer, using the account identifier, a program price associated with the account identifier; and calculating on the computer a payment due to the customer based in part on the difference between the program price and the purchase price.

In another embodiment of the invention there is provided a method and system for providing a program price for the purchase of a vehicle fuel, the method comprising the steps of: receiving usage data; determining a current price for the vehicle fuel; calculating, on the computer, using the usage data and the current price, the program price for the vehicle fuel; guaranteeing, based on the usage data, the program price; developing a financial hedging strategy to diminish the risk associated with the guaranteeing of the program price; and storing the program price on the computer for use in association with a purchase of the vehicle fuel.

It will be appreciated that the invention has application to incentive programs applicable to automobiles and other vehicles.

In another embodiment of the invention there is provided a method of purchasing an automotive fuel at a program price, comprising the steps of: purchasing an automobile; receiving with the automobile an option to purchase an automotive fuel at the program price, the option associated with an account identifier; using the account identifier to purchase the automotive fuel at a retail price; and receiving a payment determined in part by the difference between the retail price and the preset program price.

In yet another embodiment of the invention there is provided a method operable on a computer for motivating the purchase of an automobile with an incentive, comprising the steps of: offering for sale an automobile to a customer; providing with the offer an incentive including terms enabling the customer to purchase automotive fuel at a program price; selling the automobile to the customer; retrieving from the customer an account identifier; and storing on the computer the account identifier in association with the terms of the incentive whereby the terms are used to calculate a payment due to the customer when the customer purchases the automotive fuel.

DESCRIPTION OF THE FIGURES

These and other objects, features and advantages of the invention will be apparent from a reading of the attached Detailed Description of the Invention in association with the drawing Figures, the contents of which are described immediately below.

DETAILED DESCRIPTION OF THE INVENTION

Definitions

It will be understood that the terms "vehicle," "automobile," "auto," and "car," as well as variants thereof, are used interchangeably throughout this document to mean all fuel-powered motor conveyances including without limitation: cars, vans, sport-utility vehicles, trucks, motorcycles, boats, aircraft and analogous means of fuel-powered conveyance.

It will be understood that the use of the terms "sale" and "purchase", or variants thereof, as used interchangeably throughout this document to mean sales and/or leasing of vehicles to buyers.

It will be understood that the terms "gasoline," "gas," and "fuel," or variants thereof, are used interchangeably throughout this document to indicate vehicle fuel. It will be understood that the terms include all vehicle fuels including gasoline, diesel fuel, methane and other liquid and gaseous fuels, and all other fuels which are used to power a fuel-powered vehicle.

It will be understood that the term "program price" and variants thereof are used interchangeably throughout this document to indicate a price for the purchase of fuel by a consumer pursuant to the incentive program of the subject invention. As described in further detail below, many different methodologies are described for calculating a program price in accordance with the present invention.

System

Figure 1:
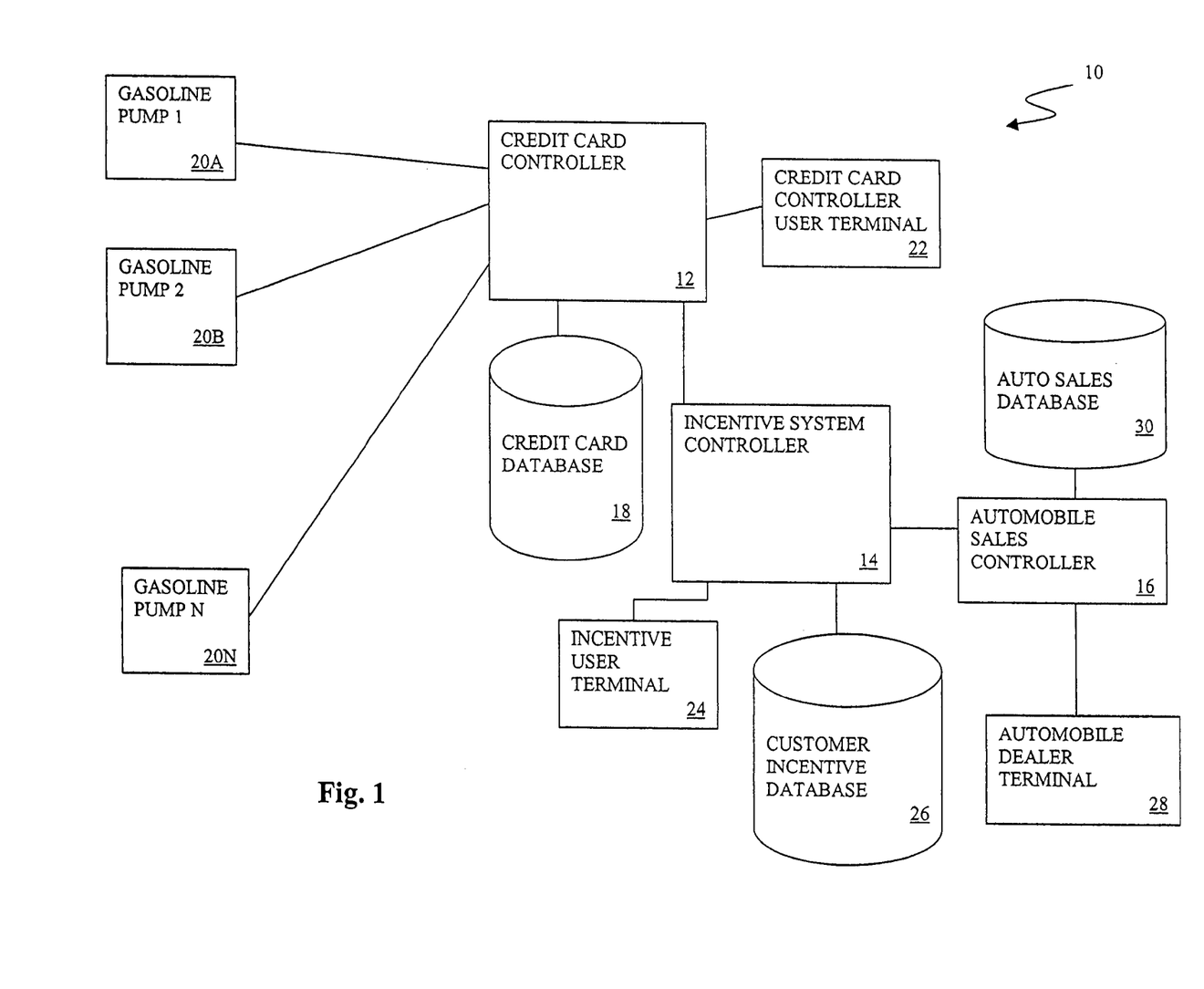
FIG. 1 is a block diagram illustrating a system for administering an incentive program in accordance with the present invention.

With reference now to FIG. 1, there is shown a computer system 10 including a credit card controller 12 connected to an incentive system controller 14 which is in turn connected to an automotive sales controller 16. Each of controllers 12, 14 and 16 comprises a conventional computer, for example an IBM-compatible, Microsoft Windows™-operated computer of a type well known in the art. As will be described in further detail below, controllers 12, 14 and 16 are typically geographically separate, with illustrated communications links comprising typical networking connections, many types of which are well known to those skilled in the art. Controllers 12, 14 and 16 are connected so as to facilitate the exchange of data in a manner described in detail herein below.

Continuing with reference to FIG. 1, credit card controller 12 is seen to support a credit card database 18 as well as communications links to remotely located gasoline pumps, three of which are shown at 20A, 20B and 20N. Credit card controller 12 is further seen to support a local user terminal 22 by which a user may enter both data and operating software and instructions. In addition to operating software and conventional credit card information typically stored in a credit card database, as is described in further detail below, database 18 includes information identifying credit card holders participating in the incentive program described herein.

While for purposes of illustration, gasoline pumps 20A–N are shown connected to credit card controller 12, it will be understood that they are typically geographically remote from the controller. Gasoline pumps are, of course, typically maintained and operated at service stations. Credit card controller 12 maybe maintained and operated, for example, by a credit card company such as Visa™ or Mastercard™. It is commonly known today to provide customers with the ability to purchase gasoline using a credit card directly at a pump or a co-located payment terminal. It will be understood that the use of the term "credit card" herein includes debit cards, Automated Teller Machine (ATM) cards and other standard cards and account identifiers used by consumers. Numerous arrangements of networks and intermediate controllers and communications links to provide gasoline purchase information including credit card numbers and purchase prices to credit card processors are well known to those skilled in the art.

Still with reference to FIG. 1, incentive system controller 14 is seen to support a local user terminal 24 for entering data, software and control information into the controller. Controller 14 further supports a customer incentive database 26 for storing customer incentive information as described in further detail below.

In a similar manner, automotive sales controller 16, connected to incentive system controller 16 as described above, supports both a local terminal 28 and an auto sales database 30.

It will be understood that, with the exception of the data contents and control instructions as described herein, databases 18, 26 and 30 comprise conventional storage facilities, for example appropriate combinations of semiconductor, magnetic and optical storage medium. Terminals 22, 24 and 28 likewise comprise conventional computer terminals, for example including displays, keyboards and related data entry devices.

With respect to the parties associated with the practice of the invention, the credit card controller is operated by a credit card company as described above. The automotive sales controller maybe operated by an automobile manufacturer with terminals distributed at local dealerships or may be operated at the location of an individual automobile dealer. The incentive program itself is preferably sponsored by an automobile manufacturer who supplies the automobile dealer. The operation of the incentive system controller to support the program maybe by the automobile manufacturer or by a third party, for example an investment bank, an investment broker, another financial institution or others having the capability to operate such a system.

Data Records

There will now be described exemplary data fields for facilitating the system operation described further below.

Figure 10:
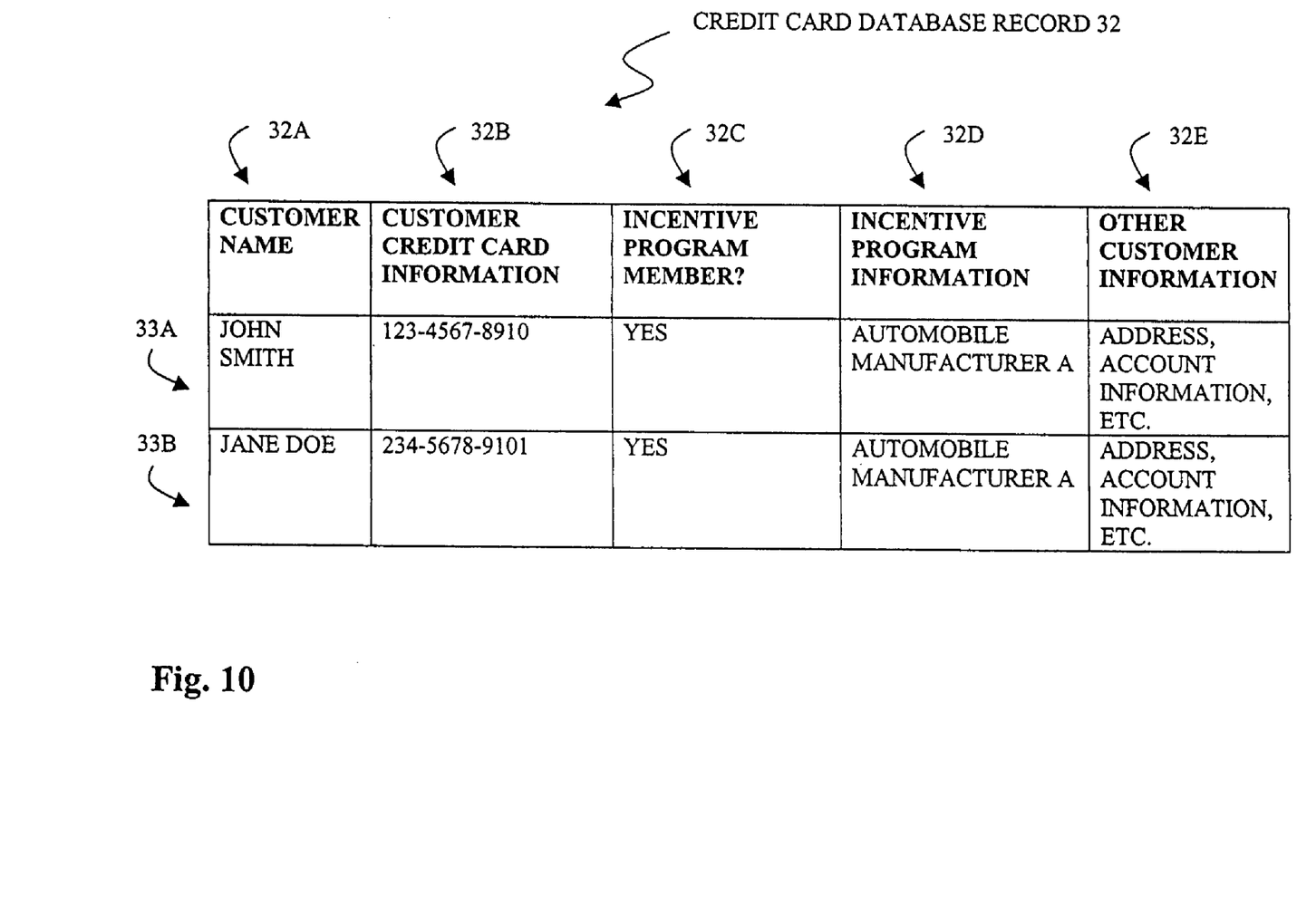
FIG. 10 is a table illustrating an exemplary credit card database record as maybe stored in the credit card database of FIG. 1.

With reference now to FIG. 10, an exemplary credit card database record 32 from credit card database 18 is shown including two data entries 33A, 33B, each entry including five data fields 32A–E. A customer name field 32A includes a customer name. A credit card information field 32B includes a customer credit card number or equivalent account identifier. An incentive program member field 32C indicates whether the customer is an active member of a fuel purchase incentive program, while additional program information is stored in an incentive program information field 32D. The later incentive program information is sufficient to identify an incentive program including communications information enabling credit card controller 12 to exchange data with incentive system controller 14. An additional field 32E is shown to indicate the storage of other information known in the art as necessary to manage a credit card customer account.

Figure 5:
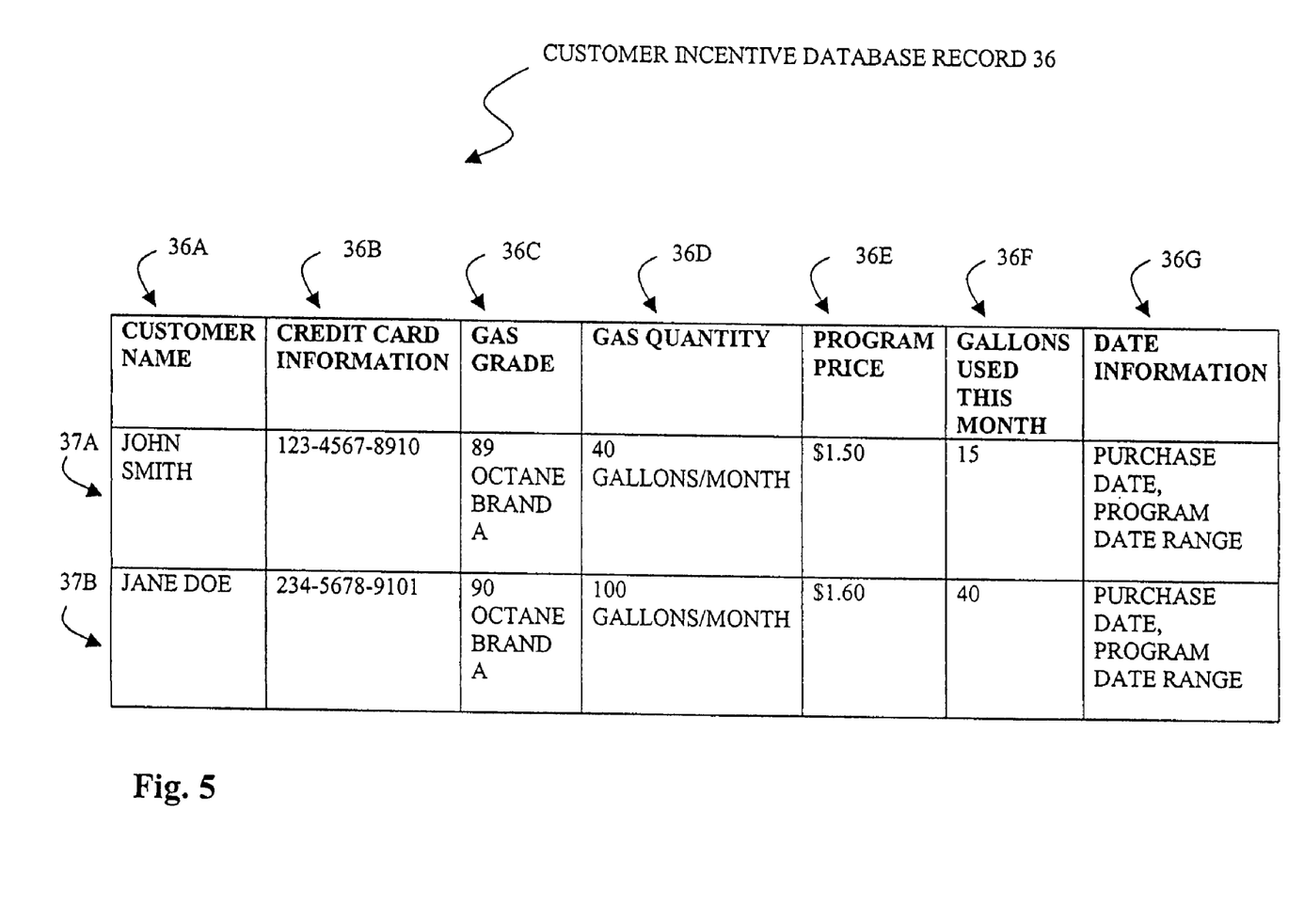
FIG. 5 is a table illustrating an exemplary customer incentive database record as may be stored in the customer incentive database of FIG. 1.

With reference now to FIG. 5, there is shown an exemplary customer incentive database record 36 from customer incentive database 26 including two data entries 37A–B, each entry including six data fields 36A–F. Data fields 36A and B store a customer name and credit card number (or equivalent account identifier), respectively. Fields 36C and D describe a type of fuel, in this case a grade and brand of gasoline, and a quantity of fuel, in this case in gallons/ month, that are covered by the incentive program. Data field 36E indicates the incentive program price in dollars per gallon, while data field 36F shows the number of gallons of fuel purchased by the consumer under the incentive program in a given month to date. A field 36G indicates the date range of the program, shown here as including the purchase date of the vehicle and the length of the program following the purchase date.

Figure 6:
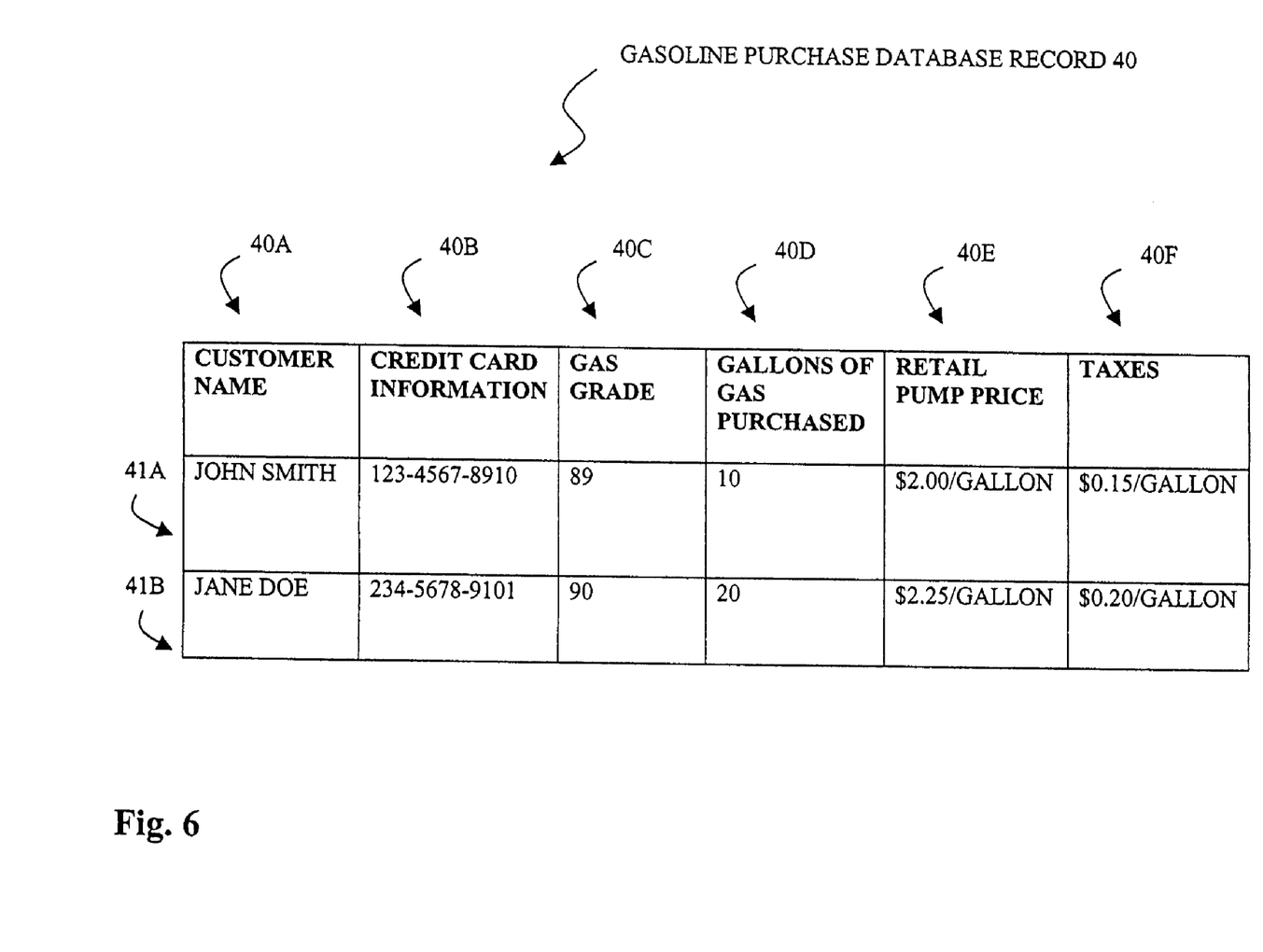
FIG. 6 is a table illustrating an exemplary gasoline purchase database record as maybe stored in the customer incentive database of FIG. 1.

With reference now to FIG. 6, there is shown an exemplary gasoline purchase database record as may be stored in credit card database 18 as a result of a fuel purchase at a pump 20. Subsequently, as described below, information from this record is used in combination with information in customer incentive database record 36 to compute a customer incentive. Database record 40 is seen to include two entries 41A and 41B, each entry comprising six fields 40A–F. Database fields 40A, B comprise a customer name and credit card account number (or equivalent account identifier), respectively. Data fields 40C and 40D store the type, in this exemplary case the grade and brand, and the quantity in gallons of a recent fuel purchase, respectively. Fields 40E and 40F contain the retail pump price and the component of tax within that sales price. Various sources of sales tax information are contemplated by the present invention as described below.

Figure 7:
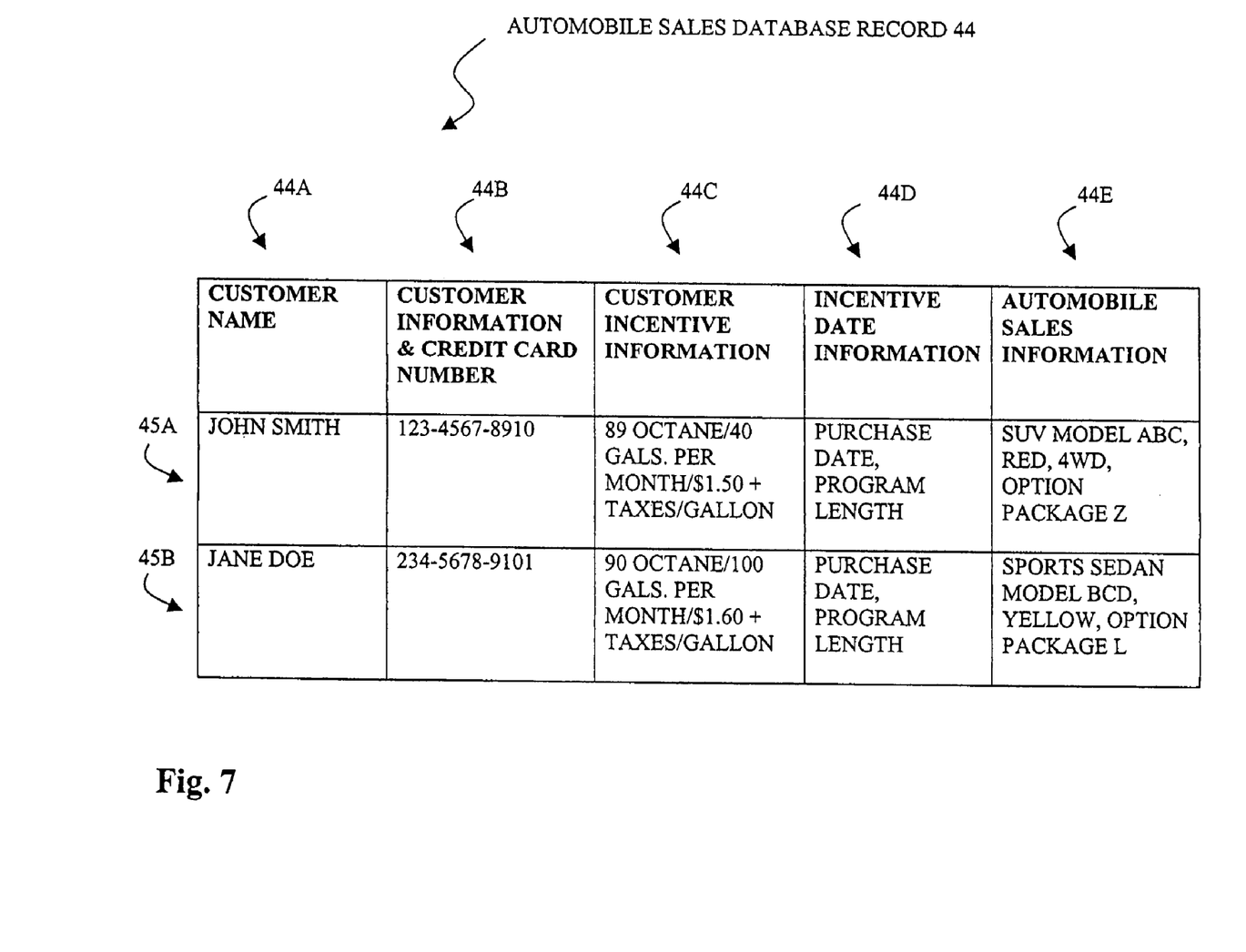
FIG. 7 is a table illustrating an exemplary automobile sales database record as may be stored in the automobile sales database of FIG. 1.

With reference now to FIG. 7, an exemplary automobile sales database record 44 is shown as maybe stored in auto sales database 30. Record 44 contains two entries 45A and B, each of which includes four fields. Data field 44A includes a customer name, while data field 44B includes personal customer information relating to an automobile sale, including for purposes of this invention a credit card account number (or other account identifier). Field 44B or other fields may further include numerous additional data as maybe relevant to the automobile dealer and manufacturer, for example customer address, demographics, etc. A data field 44C includes customer incentive information, including the grade, brand, quantity and program price of the fuel purchase incentive. A field 44D includes incentive program date information such as a purchase date and program length. Ad field 44E includes other automobile sales information, which maybe of interest or use to a dealer or manufacturer, for example the type, model and color of the automobile purchased.

It will be understood that the data records as described herein are exemplary of the present invention and numerous other configurations as well as data storage arrangements will now be apparent to those skilled in the art.

Operation of the System

The various processes associated with the operation of the system will now be described with respect to FIGS. 2, 3, 4, 8 and 9.

Figure 2:
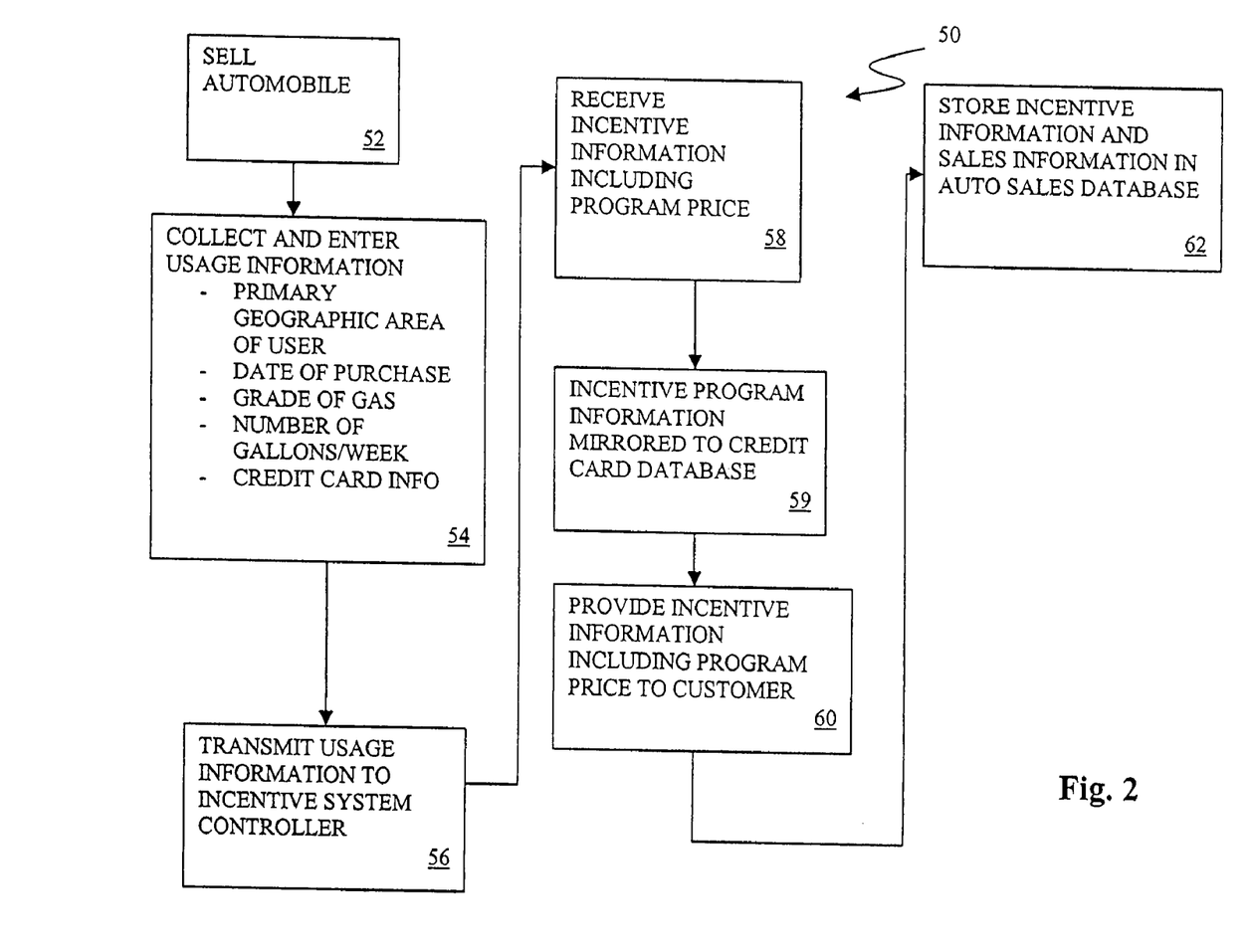
FIG. 2 is a flow chart illustrating a process by which an automotive dealer may initiate a gasoline incentive program.

With reference first to FIG. 2, a process 50 is shown for establishing the fuel incentive program of the subject invention incident to the sale of a vehicle. For purposes of illustration, the invention is described relative to the sale of an automobile pursuant to a gasoline purchase incentive program.

Incident to the sale of an automobile by an automobile dealer (step 52), the dealer collects usage information relating to the anticipated use of the vehicle by the buyer and enters same into automobile sales controller 16 (step 54). Such usage information includes data relative to the calculation of a gasoline program price, such as: the primary geographic area of the user, the date of purchase of the vehicle, the grade of gasoline to be purchased by the buyer, the number of gallons per week that the buyer anticipates purchasing for the automobile, and the buyers credit card information. In a first embodiment of the invention, the customer may indicate his preference as to a brand of gasoline. In another embodiment, the brand may be determined by the provider of the incentive program. Similarly, in one embodiment of the invention the customer may indicate the desired or anticipated fuel usage. In an alternate embodiment of the invention the program operator predetermines the fuel quantity available under the incentive program. In the described embodiment, the quantity of fuel made available under the incentive program will be indicated in gallons per month. This information is stored in the customer incentive field 44C of automobile sales database record 44 (FIG. 7).

Subsequent to the collection of the information, all relevant information necessary to the calculation of a program price (the calculation process being described below) is transmitted from automotive sales controller 16 to incentive system controller 14 (step 56). The incentive system controller is used to calculate a program price and other information and parameters pertinent to the incentive program (described below with reference to FIG. 3) and the incentive program information is transmitted back to and received by automotive sales controller 16 from incentive system controller 14 (step 58). A copy of the incentive program information is further transmitted to credit card controller 12 where it is indexed by a customer identifier such as the credit card number and a flag set (field 32C of credit card database record 32 (FIG. 10)) indicating that the customer is a participant in the program (step 59). The incentive system controller, in a manner described below, stores a copy of the incentive program data in customer incentive database 32.

Subsequently, a copy of the incentive program information, along with directions for its use, is provided to the customer (step 60). A permanent copy of the incentive program information is stored in automotive sales database record 44 for future use by the automobile dealer and/or the automobile manufacturer (step 62).

In an alternate embodiment of the invention, as a condition to a buyer participating in the incentive program, the buyer is required to open a co-branded credit card account with the automobile dealer or a participating gasoline dealer or other participant in the transaction. The co-branded credit card account information is added to credit card database 18 and the account number is used to track the buyer's participation in the program. In one embodiment of the invention, a fee is paid to the program operator by either the credit card provider or the co-branded company, or both, as a finder's fee for the new credit card account. The fee maybe used by the operator of the program to optionally lower the program price of the gasoline.

Figure 3:
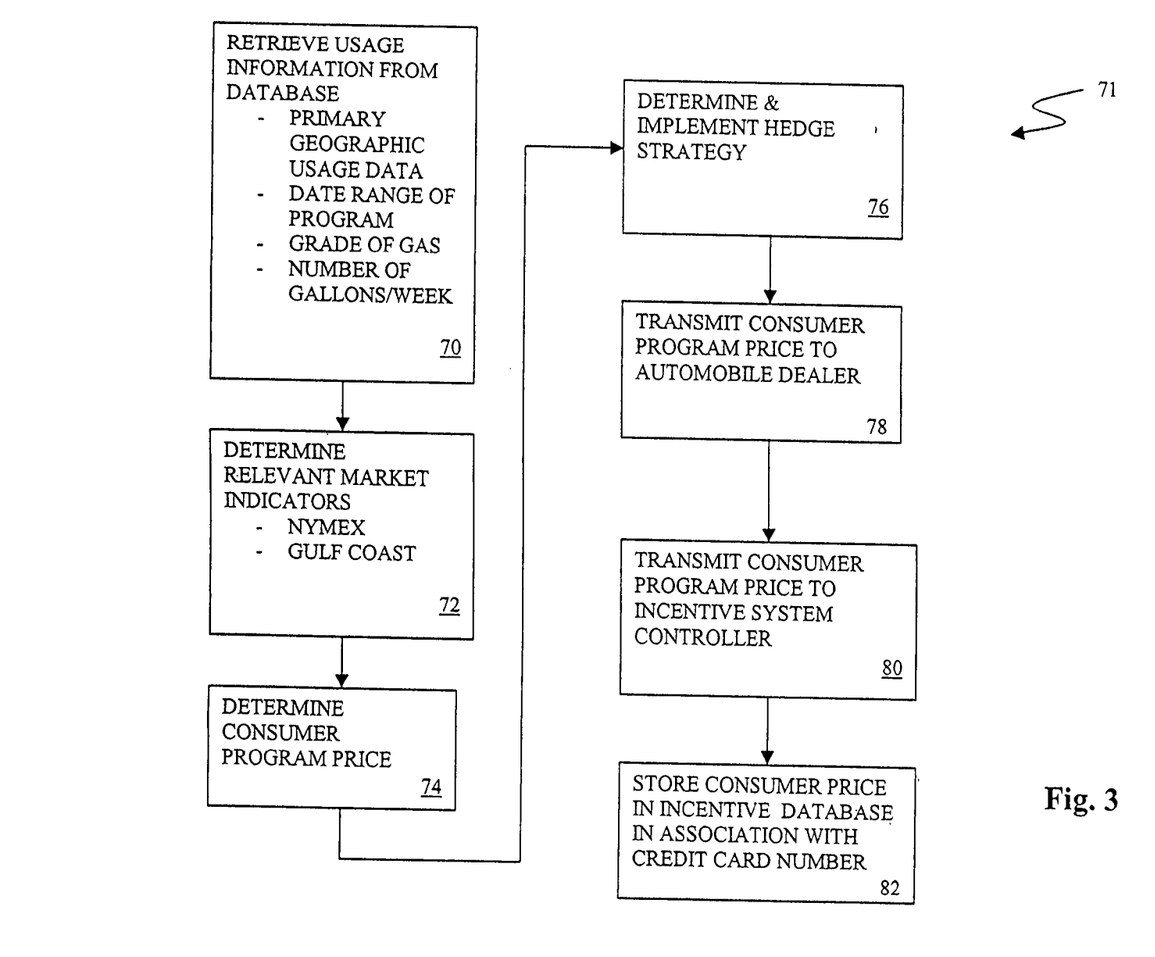
FIG. 3 is a flow chart illustrating a process by which an incentive provider may calculate the parameters of a gasoline incentive program.

With reference now to FIG. 3, there is shown a process 71 for determining a program price for the fuel purchased under the incentive program of the present invention. Initially, the type, quantity, date range of the program, anticipated geographic area of fuel purchases and any other information relevant to the future cost of gasoline is retrieved from customer incentive database record 36 (step 70). Subsequently, relevant market factors are considered, including for example the current and futures prices for gasoline available through the NYMEX and Gulf Coast gasoline exchanges (step 72) and a consumer program price for the incentive program is calculated (step 74). Optionally, as described below, a hedge program maybe determined and implemented by the program operator to hedge risks associated with the program (step 76).

It will be understood that the commodity price of gasoline can be hedged through the purchase of appropriate financial derivatives, including futures contracts and options. However, in addition to the actual gasoline commodity price, there are additional, more volatile costs associated with the delivery of gasoline to the pump. These costs include for example the cost of transportation, the retail margin and both federal and local taxes. No traditional hedges exist for these more volatile costs. Accordingly, there will be many different methods of calculating a consumer program price under the present incentive program. Without limitation, different methodologies include: including the tax as a fixed cost included within the program price and assuming the risks associated with fluctuations of the tax; adding the actual tax associated with each purchase into the program price such that the program price comprises a fixed base price plus tax; providing a single, geographically independent program price; and, providing a series of program prices that vary with the geographic location of the gasoline fuel purchase.

With further consideration of the setting of a program price, the program price may constitute a discount to a retail price, or a cap on the maximum price a participant will pay. When a cap price is set, a consumer will be free to purchase gasoline at any lower market price should the market price be less than the capped program price.

Those skilled in the art will now recognize many different methodologies for determining a program price in accordance with the present invention.

For purposes of illustration, in the described embodiment the program price provided in the incentive program is independent of geographic location and exclusive of taxes. That is, the consumer price comprises a fixed, geographically independent base price plus the cost of taxes associated with each purchase of fuel.

As described above, the operator of the incentive program may optionally hedge the risk associated with determining a program price using traditional financial derivatives such as a futures contract and/or options.

Continuing again with reference to FIG. 3, subsequent to the calculation of the consumer program price (step 76), the program price is transmitted to the automobile dealer for providing to the buyer (step 78) and to the incentive system controller 14 (step 80) for storage in association with the customer account information in customer incentive database record 36 (step 82).

In the described embodiment, the consumer will thus be informed that his program price under the incentive program comprises a fixed, geographically independent base price plus the actual cost of taxes. If, alternatively, the program price were dependent on geography, the consumer would be provided with a 'state card' indicating the program price in each state (or other selected geographic region).

Figure 4:
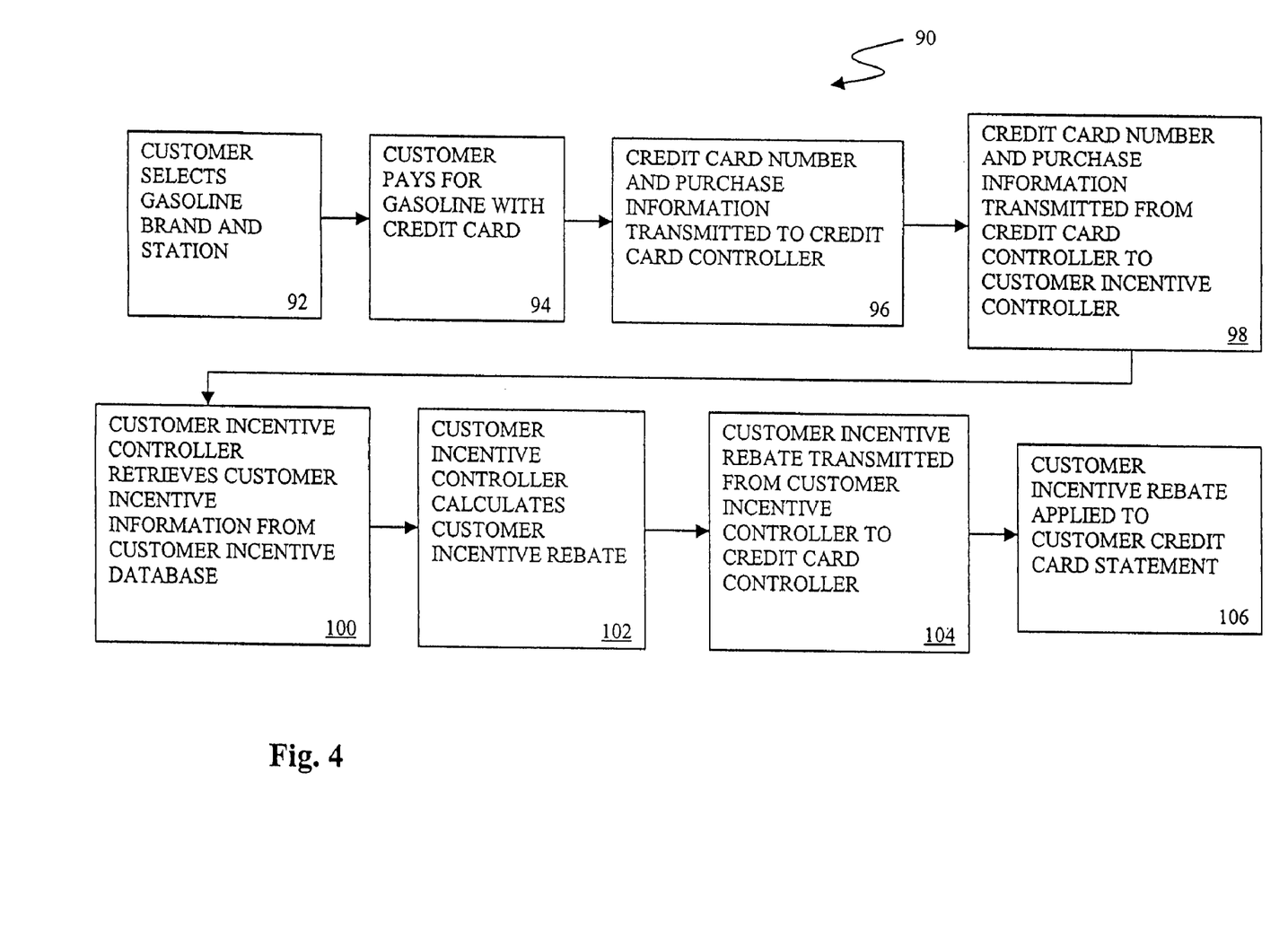
FIG. 4 is a flow chart illustrating a process by which a customer may purchase gasoline and receive an incentive in accordance with the present invention.

With reference now to FIG. 4 there is shown a process 90 for applying the gasoline incentive, in the form of a rebate against a gasoline purchase, to a customer credit card.

A customer purchases gasoline, selecting a brand and a grade consistent with the terms of the incentive program (step 92) which has been provided to him by the dealer in the manner described above. The customer completes the purchase using the credit card registered with the incentive program for payment (step 94) and the purchase information is transmitted in a conventional manner to credit card controller 12 (step 96).

Based on the customer name and/or credit card account number (or other appropriate identifying information) stored in credit card database record 32, credit card controller 12 identifies the gasoline purchase as subject to an incentive program. Using the incentive program information in database record 32 (FIG. 10), credit card controller 12 transmits the gasoline purchase information to incentive system controller 14 (step 98). Incentive system controller retrieves the customer incentive information from customer incentive database record 36 in customer incentive database 26 (step 100) and calculates the rebate due to the customer (step 102) (described in detail below). The customer incentive rebate is transmitted from incentive system controller 14 to credit card controller 12 (step 104), where the rebate is applied to a customer credit card statement.

Thus in the present embodiment of the invention, a beneficiary of the inventive incentive program would receive a credit card bill including at least two line items pertinent to the subject incentive program: a first line item indicating the market cost of a gasoline purchase, and a second line item indicating a rebate credited against the balance due in an amount equal to the incentive. Alternate methods of providing the amount due to the customer under the program will be apparent, and include but are in no way limited to: a credit against a credit card account as described, a credit against a checking account, a direct payment to a customer and a credit against a future, related purchase. Again, details on calculating the incentive rebate as a function of the program price are described below.

Figure 8:
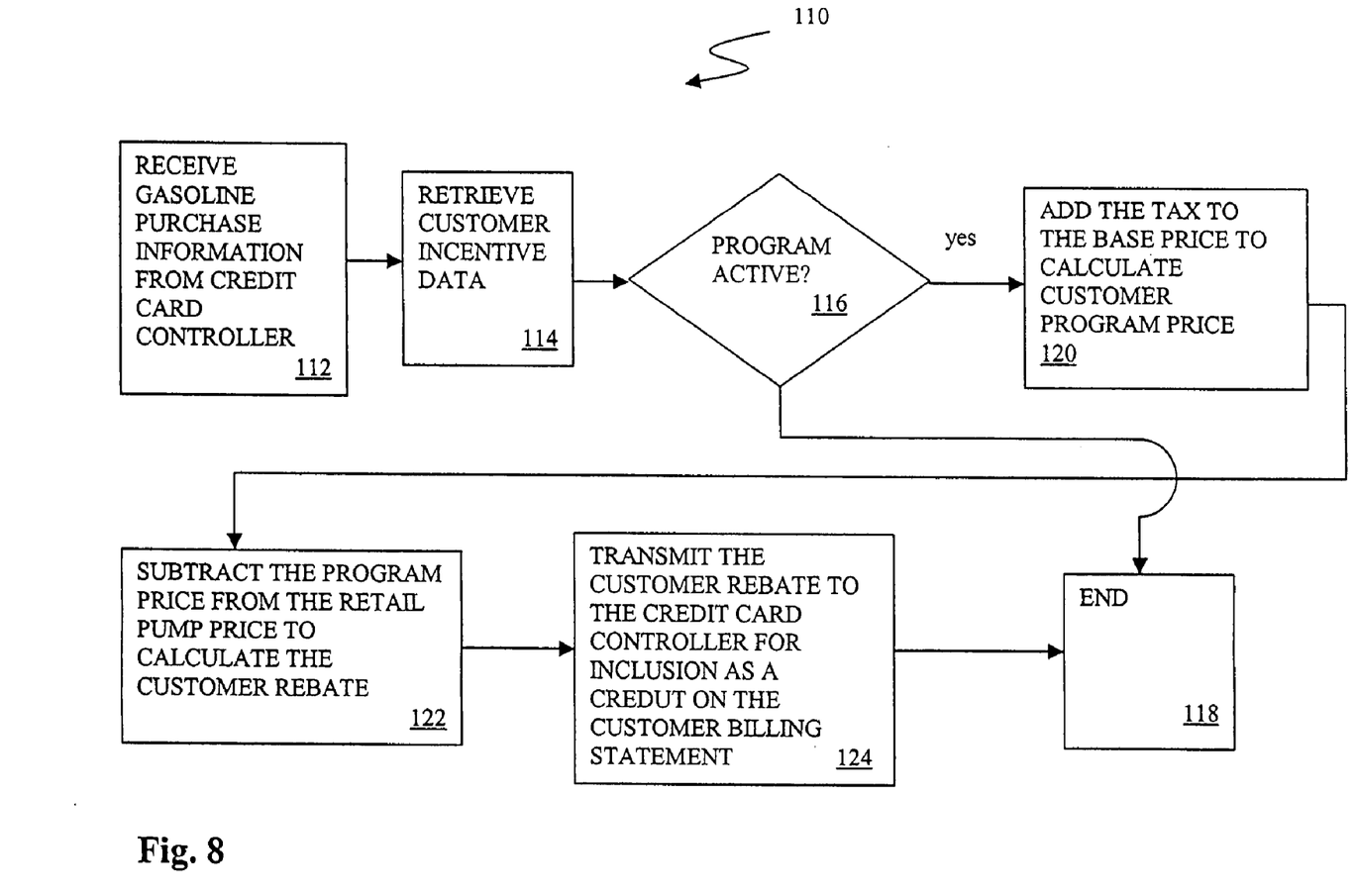
FIG. 8 is a flow chart illustrating a process by which a customer rebate incentive may be calculated and applied to a customer credit card bill in accordance with the present invention.
Figure 9:
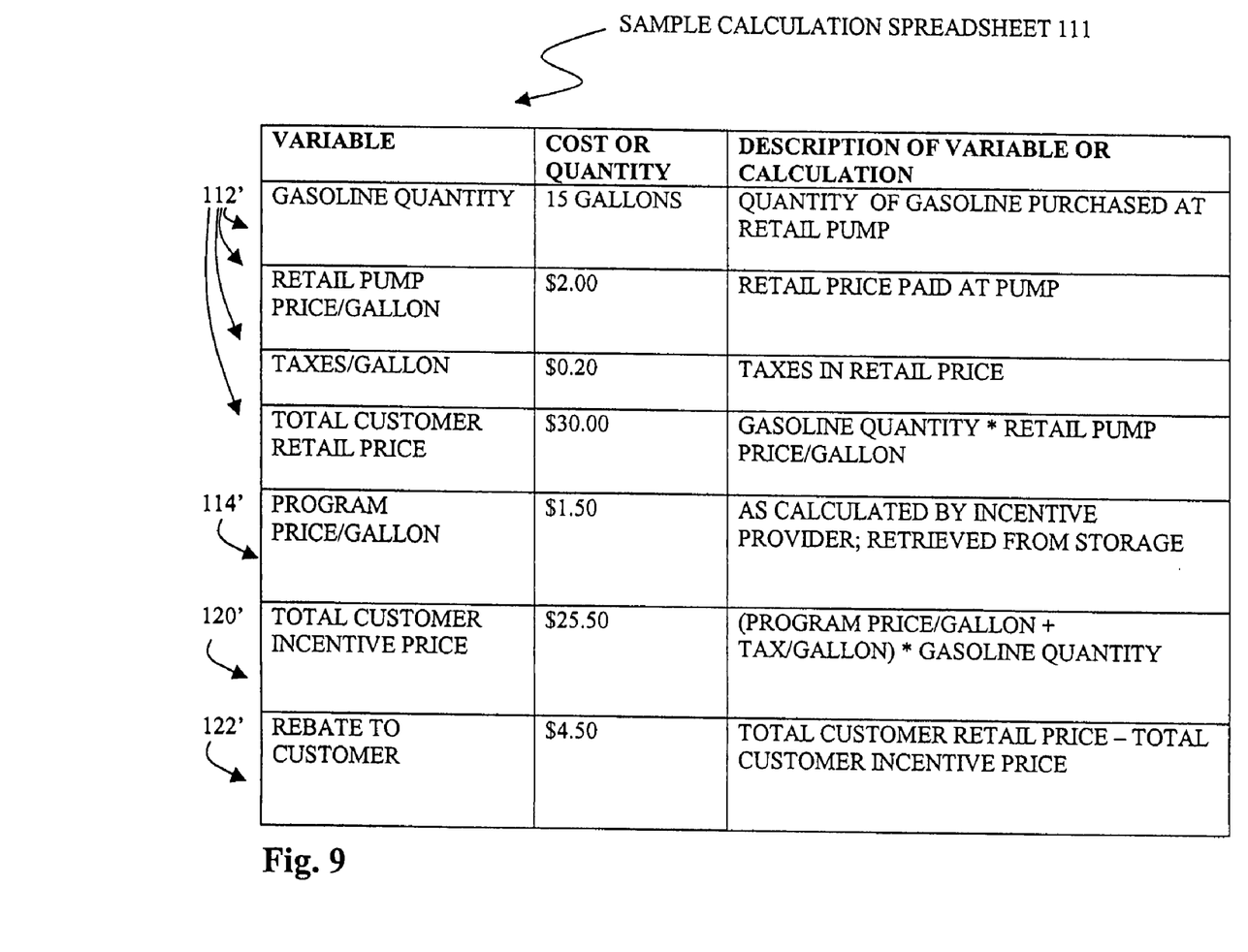
FIG. 9 is a table illustrating an exemplary calculation of a customer rebate incentive in accordance with the process of FIG. 8.

With reference now to FIGS. 8 and 9, an exemplary method of calculating a customer incentive in the form of a rebate is shown and described. Steps indicated in FIG. 8 are shown as like numbered, 'primed' entries in the exemplary spreadsheet table 111 of FIG. 9.

With reference now to FIG. 8, incentive system controller 14 receives gasoline purchase information from credit card controller 12 in the manner described above. This information includes a date of purchase (which maybe assumed to be the date the purchase information is provided to the controller since credit card purchases are typically 'cleared' on a real-time basis), a quantity in gallons, a retail pump price, a tax/gallon, and the total purchase price (step 112, spreadsheet entries 112'). Customer incentive data is retrieved from data record 36 in customer incentive database 26 (step 114) and preliminary checks are completed to determine if this purchase is subject to the incentive rebate (step 116). One such check includes whether the customer has exceeded the number of gallons/month provided in the incentive program. Other such checks include the brand and grade of gasoline, as well as the date range of the purchase relative to the active dates of the program. If the incentive program does not cover the purchase, the process terminates (step 118).

Assuming that the purchase is subject to the incentive program, the tax is added to the base price to calculate a customer program price, the customer program price being multiplied by the number of gallons purchased to determine a total customer program price for the particular fuel purchase (step 120, spreadsheet entry 120'). The total customer program price is subtracted from the retail pump price to calculate the rebate, credit or direct payment due to the customer (step 122, spreadsheet entry 122'). The customer rebate is transmitted from the incentive system controller 14 to credit card controller 12 for application as a credit to a customer credit card statement (step 124) and the process ends (step 118).

In the described embodiment, the tax is received from the gasoline pump. Alternatively, the tax maybe received from another source, such as tax tables maintained by a public or private source.

While the invention has been shown and described with respect to detailed embodiments, numerous other variations and improvements falling within the scope of the invention will occur to those knowledgeable in the art.

What is claimed is:

1. A method operable on a computer to provide a plurality of users participating in a fuel pricing program respective rebate payments relating to purchases of automotive fuel, comprising the steps of:
    receiving an account identifier associated with each user;
    receiving, from each user, an anticipated geographic area associated with automotive fuel purchases;
    storing said received anticipated geographic areas in association with each respective received account identifier on said computer;
    receiving purchase information indicating purchases of said automotive fuel at a retail price and at a geographic location using a respective account identifier;
    storing said received purchase information on said computer;
    utilizing the computer to calculate a payment due to each user; and
    providing each user a respective calculated payment;
    wherein each respective payment is calculated by said computer based at least in part upon one of a first program price associated with each user and a second program price associated with each user as well as upon said retail price, wherein the first program price for each user is independent of the first program price for each other user and the second program price for each user is independent of the second program price for each other user; and
    wherein each payment for each user is calculated by said computer based at least in part upon the respective first program price for that user when the geographic location of the automotive fuel purchase corresponds to the anticipated geographic area associated with automotive fuel purchases for that user and each payment for each user is calculated by said computer based at least in part upon the respective second program price for that user when the geographic location of the automotive fuel purchase does not correspond to said anticipated geographic area associated with automotive fuel purchases for that user.

2. The method of claim 1, wherein at least one of said first program price for each user and said second program price for each user is a discount to said retail price.

3. The method of claim 1, wherein at least one of said first program price for each user and said second program price for each user is a capped price.

4. The method of claim 1, wherein at least one of said first program price for each user and said second program price for each user is based at least in part upon an effective time period, and a quantity, a grade and a brand of said automotive fuel; and said purchase information includes a date, a quantity, a grade and a brand of said automotive fuel.

5. The method of claim 1, wherein said account identifier identifies a co-branded account having a finders fee associated therewith; and at least one of said first program price for each user and said second program price for each user is based at least in part on said finders fee.

6. The method of claim 1, wherein at least one of said first program price for each user and said second program price for each user is inclusive of taxes on said automotive fuel.

7. The method of claim 1, wherein at least one of said first program price for each user and said second program price for each user is exclusive of taxes on said automotive fuel.

8. The method of claim 1, wherein said payment due to each of said users is provided as a credit to an account identified by a respective account identifier.

9. A system for providing a plurality of users participating in a fuel pricing program respective rebate payments relating to purchases of an automotive fuel, comprising:
    a processor; and
    a memory operatively connected to said processor;
    wherein said processor is operative with control instructions in said memory to perform the steps of:
    receiving an account identifier associated with each user;
    receiving, from each user, an anticipated geographic area associated with automotive fuel purchases;
    storing said received anticipated geographic areas in association with each respective account identifier in said memory;

receiving purchase information indicating purchases of said automotive fuel at a retail price and at a geographic location using a respective account identifier;

storing said received purchase information in said memory;

utilizing the processor to calculate a payment due to each user; and providing each user the calculated payment;

wherein each respective payment is calculated by said processor based at least in part upon one of a first program price associated with each user and a second program price associated with each user as well as upon said retail price, wherein the first program price for each user is independent of the first program price for each other user and the second program price for each user is independent of the second program price for each other user; and wherein each payment for each user is calculated by said processor based at least in part upon the first program price for that user when the geographic location of the automotive fuel purchase corresponds to said anticipated geographic area associated with automotive fuel purchases for that user and each payment for each user is calculated by said processor based at least in part upon the second program price for that user when the geographic location of the automotive fuel purchase does not correspond to said anticipated geographic area associated with automotive fuel purchases for that user.

10. The system of claim 9, wherein at least one of said first program price for each user and said second program price for each user is a discount to said retail price.

11. The system of claim 9, wherein at least one of said first program price for each user and said second program price for each user is a capped price.

12. The system of claim 9, wherein at least one of said first program price for each user and said second program price for each user is based at least in part upon an effective time period, and a quantity, a grade and a brand of said automotive fuel; and said purchase information includes a date, a quantity, a grade and a brand of said automotive fuel.

13. The system of claim 9, wherein said account identifier identifies a co-branded account having a finders fee associated therewith; and at least one of said first program price for each user and said second program price for each user is based at least in part on said finders fee.

14. The system of claim 9, wherein at least one of said first program price for each user and said second program price for each user is inclusive of taxes on said automotive fuel.

15. The system of claim 9, wherein at least one of said first program price for each user and said second program price for each user is exclusive of taxes on said automotive fuel.

16. The system of claim 9, wherein said payment due to each of said users is provided as a credit to an account identified by a respective account identifier.

* * * * *